(12) United States Patent
Tauber (10) Patent No.: US 11,107,606 B2
(45) Date of Patent: Aug. 31, 2021

(54) CONTAMINATION PROTECTION FOR HIGH-VOLTAGE INSULATORS

(71) Applicant: BAYERNWERK NETZ GMBH, Regensburg (DE)

(72) Inventor: Wolfgang Tauber, Eschenbach (DE)

(73) Assignee: BAYERNWERK NETZ GMBH, Regensburg (DE)

( * ) Notice: Subject to any disclaimer, the term of this patent is extended or adjusted under 35 U.S.C. 154(b) by 155 days.

(21) Appl. No.: 16/466,591

(22) PCT Filed: Dec. 6, 2017

(86) PCT No.: PCT/EP2017/081605
§ 371 (c)(1),
(2) Date: Jun. 4, 2019

(87) PCT Pub. No.: WO2018/104352
PCT Pub. Date: Jun. 14, 2018

(65) Prior Publication Data
US 2020/0075198 A1   Mar. 5, 2020

(30) Foreign Application Priority Data
Dec. 6, 2016   (EP) .................................... 16202326

(51) Int. Cl.
*H01B 17/00* (2006.01)
*H01B 17/62* (2006.01)
(Continued)

(52) U.S. Cl.
CPC .............. *H01B 17/12* (2013.01); *H01B 17/06* (2013.01); *H01B 17/38* (2013.01)

(58) Field of Classification Search
CPC ........ H01B 17/12; H01B 17/06; H01B 17/38; H01B 17/50; H01B 17/00; H01B 17/005;
(Continued)

(56) References Cited

U.S. PATENT DOCUMENTS

| 4,201,883 A | 5/1980 | Shepherd et al. |
| 5,679,922 A | 10/1997 | Harben |

(Continued)

FOREIGN PATENT DOCUMENTS

| CN | 2763222 Y | 3/2006 |
| CN | 203201334 U | 9/2013 |

(Continued)

OTHER PUBLICATIONS

International Search Report for PCT/EP2017/081605, dated Feb. 20, 2018, 15 pages. Includes English translation.

*Primary Examiner* — Angel R Estrada
(74) *Attorney, Agent, or Firm* — Casimir Jones, S.C.; Brian F. Bradley (57) ABSTRACT

The invention relates to a contamination protection device for high-voltage insulators and an arrangement consisting of the contamination protection device and a high-voltage insulator. The contamination protection device for high-voltage insulators according to the invention is designed to be mounted on the insulator cap of the high-voltage insulator and comprises for this purpose a mounting region, which is designed to be interlockingly connected to the insulator cap and comprises a through-opening for the connecting element of the insulator cap. A protective shield is furthermore provided, which extends radially around the mounting region in order to cover the high-voltage insulator. The arrangement comprises a high-voltage insulator with an insulator cap and a contamination protection device disposed on the insulator cap, wherein the contamination protection device is designed according to the invention and is connected to the insulator cap by means of an interlocking connection.

23 Claims, 12 Drawing Sheets

(51) Int. Cl.
*H01B 17/12* (2006.01)
*H01B 17/06* (2006.01)
*H01B 17/38* (2006.01)

(58) Field of Classification Search
CPC .. H02G 7/00; H02G 7/02; H02G 1/02; H05K 5/03; H05K 5/02; H05K 5/0204; H05K 5/0217; H01R 4/70; H02B 1/06; H02B 1/063; H02B 1/14; H01H 31/00; H01H 9/02; H01H 9/0264; H01H 31/006
USPC ..... 174/140 R, 14 BH, 137 R, 138 F, 140 H, 174/142, 135, 152 G, 153 G, 138 R, 139, 174/5 R; 337/168, 202, 186, 414; 361/232
See application file for complete search history.

(56) References Cited

U.S. PATENT DOCUMENTS

| | | | | |
|---|---|---|---|---|
| 5,834,686 A * | 11/1998 | Barrett | ............... | H01B 17/50 174/5 R |
| 5,864,096 A * | 1/1999 | Williams | ............... | H01B 17/00 174/139 |
| 6,255,597 B1 * | 7/2001 | Bowling | ............... | H01B 17/00 174/138 F |
| 6,291,774 B1 | 9/2001 | Williams | | |
| 6,770,809 B1 * | 8/2004 | De France | ............ | H01B 17/00 174/138 R |
| 7,301,096 B2 * | 11/2007 | Strong | ............... | H01B 17/00 174/5 R |
| 8,426,729 B2 * | 4/2013 | Hiller | ............... | H01B 17/00 174/5 R |
| 9,413,153 B2 * | 8/2016 | Spencer | ............... | H01B 17/00 |
| 10,881,097 B2 * | 1/2021 | Lynch | ............... | H01H 31/127 |

FOREIGN PATENT DOCUMENTS

| | | |
|---|---|---|
| CN | 104200935 | 12/2014 |
| CN | 205036198 U | 2/2016 |
| EP | 1566869 | 8/2005 |
| JP | H10 199350 | 7/1998 |
| JP | 2012038736 | 2/2012 |
| WO | 96/16416 | 5/1996 |

\* cited by examiner

CONTAMINATION PROTECTION FOR HIGH-VOLTAGE INSULATORS

The invention relates to a contamination-protection device for high-voltage insulators and also to an arrangement consisting of contamination-protection device and high-voltage insulator.

Above-ground high-voltage lines are normally routed via high-voltage towers. In order to isolate the high-voltage towers electrically from the high-voltage lines, high-voltage insulators are provided in each instance at the points of suspension between the high-voltage lines and the high-voltage towers. In this regard, long-rod insulators frequently come into operation which have been suspended from cross-members of the high-voltage tower, and at the free end of which the high-voltage line has been attached.

Even if the high-voltage insulators have, in principle, been adequately designed for the desired insulation between high-voltage line and high-voltage tower, so-called ground faults and short circuits to ground occur again and again, in the case of which a high-voltage insulator is bridged and the high-voltage line attached thereto is connected to the ground via the high-voltage tower. Depending upon the treatment of the neutral point of the high-voltage network and upon the duration of the mains interference, these unipolar faults can have massive effects on downstream networks and coupled loads, for which reason efforts are being made in the state of the art to reduce these interferences and to enhance operational safety.

Since directly impacting or deposited bird droppings—particularly in combination with moisture—have been identified as a cause of the occurrence of ground faults and short circuits to ground in the high-voltage insulators, Technical Specification of the International Electrotechnical Commission IEC/TS 60815-1:2008—*Selection and dimensioning of high-voltage insulators intended for use in polluted conditions—Part* 1: *Definitions, information and general principles*, for instance, proposes " . . . to fit dissuasive devices or perches, appropriate to the local fauna and structure design", in order to prevent birds above the high-voltage insulators from settling on the high-voltage towers, doing their business, and thus contaminating the high-voltage insulators. However, it has become evident that ground faults and short circuits to ground can be reduced by appropriate devices only to a manageable extent.

Protective devices are also known in which canopies are provided directly on the high-voltage tower above the high-voltage insulators on the tower cross-members, said canopies having been designed to keep bird droppings away from the high-voltage insulators. Even if the contamination of the high-voltage insulators can be distinctly reduced with the aid of appropriate canopies, the canopies according to the state of the art have some disadvantages. Accordingly, the costs of the procurement and mounting of the canopies are considerable, the statics of the tower—particularly in the case of ice, snow and strong wind—are influenced adversely, and maintenance work on the tower cross-members and on the high-voltage insulators is rendered difficult.

The object underlying the invention is therefore to create a device for effective reduction of ground faults and short circuits to ground in respect of above-ground high-voltage lines by reason of bird droppings, in which the disadvantages known from the prior art no longer arise, or arise only to a lesser extent.

This object is achieved by a contamination-protection device as claimed in the main claim and also by an arrangement consisting of contamination-protection device and high-voltage insulator as claimed in claim 15.

Advantageous further developments are the subjects of the dependent claims.

Accordingly, the invention relates to a contamination-protection device for high-voltage insulators, for attachment to the insulator cap of the high-voltage insulator, comprising an attachment region, which has been designed for a positive connection to the insulator cap and exhibits a feed-through aperture for the connector element of the insulator cap, and a protective screen which extends radially around the attachment region in order to cover the high-voltage insulator.

The invention further relates to an arrangement comprising a high-voltage insulator with insulator cap and a contamination-protection device arranged on the insulator cap, said contamination-protection device having been designed in accordance with the invention and connected to the insulator cap by positive closure.

The contamination-protection device according to the invention offers good protection in respect of contamination caused by birds, the bird droppings being kept away from the high-voltage insulator, in particular by the protective screen.

The invention has recognized that the insulator caps normally provided in high-voltage insulators—particularly if they take the form of long-rod insulators—for the purpose of linking to a high-voltage tower are especially suitable for attaching a contamination-protection device thereto. A sufficient attachment in this case can already be obtained by positive closure between the attachment region of the contamination-protection device and the insulator cap. For the connector element of the insulator cap, with which the insulator cap and hence the high-voltage insulator are ultimately attached to a high-voltage tower, the contamination-protection device exhibits a feed-through aperture.

No structural change to the high-voltage insulator, to the insulator cap and/or the high-voltage tower is required for the installation of a contamination-protection device according to the invention, so standardized and already approved components can continue to be drawn upon. Since the contamination-protection device according to the invention has been arranged on the insulator cap and hence on the ground-potential side of the high-voltage insulator, it also does not have to satisfy any particular electrical requirements. The positive-closure connection between attachment region and insulator cap may also already be so sufficient that no further attachment elements are required. In particular in this case, frequently no tool of any kind is then required for the actual mounting of the contamination-protection device according to the invention.

Inasmuch as the protective screen extends radially around the attachment region which interacts with the insulator cap, it has been ensured that the protective screen extends over the entire periphery of the high-voltage insulator. In this regard, the invention provides that the protective screen covers the high-voltage insulator—that is to say, it has been dimensioned in such a manner that the dimension of the protective screen perpendicular to the longitudinal axis of the high-voltage insulator is in all directions equal to or greater than the respective largest dimension of the shaft of the high-voltage insulator or of the insulator screens arranged thereon.

It is preferred if the attachment region is hat-shaped and designed to be slipped over the insulator cap. By virtue of an appropriate shaping, a particularly good positive closure can be obtained between attachment region and insulator cap. The term "hat-shaped" in this connection encompasses both practical variants in which the protective screen adjoins the lower end of the hat-shaped region in the manner of a "brim" and those in which the roof of the hat-shaped region merges directly with the protective screen.

It is preferred if the contamination-protection device exhibits a radial mounting aperture, extending from the feed-through aperture as far as the outer edge of the protective screen, for lateral feed-through of the connector element of the insulator cap of the contamination-protection device. Through an appropriate mounting aperture the contamination-protection device can be pushed laterally onto the insulator cap, so that a mounting of the contamination-protection device is possible even in the case of an insulator cap linked to a high-voltage tower. Since the mounting is undertaken on the ground-potential side of the high-voltage insulator, where appropriate not even a disconnection of the high-voltage line affected is required for this.

If the contamination-protection device is sufficiently elastic, it may be sufficient if the mounting aperture has been realized as a slit—that is to say, as a gap with zero width—so that the mounting aperture can be widened during mounting. Comparable remarks also apply, of course, if the mounting aperture has been configured as a gap with a predetermined width, which—given sufficient elasticity—can be widened during mounting. If the contamination-protection device is not (sufficiently) elastic, the mounting aperture should preferentially have a sufficient minimum width in order to push the contamination-protection device onto the insulator cap at the narrowest point of the latter. In both cases, at least one tab, optionally extending across the mounting aperture, may have been provided, in order to secure the mounting aperture against unintentional passage of the insulator cap through it, and/or to impart additional dimensional stability to the contamination-protection device.

Such a tab may, for instance, have been attached to the contamination-protection device, for instance to the protective screen, on one side of the mounting aperture so as to be capable of swiveling, and may exhibit at the other end a part of a detent closure—a detent element or an engagement aperture. On the other side of the mounting aperture the counterpart to the detent closure then has to be provided, with which the part of the detent closure on the tab can optionally interact. Alternatively, there may be provision to realize the tab as a separate tab element which exhibits at each of its two ends a part of a detent closure—a detent element or an engagement aperture. In this case suitable counterparts to the detent closures have to be provided on the contamination-protection device on both sides of the mounting aperture. The tab element may have been connected to the contamination-protection device in captive manner via a material bridge, in which case this material bridge can be bent or destroyed in the course of mounting.

The mounting aperture may have been widened in some sections for the feed-through of other elements of the high-voltage insulator, for instance the holder of an arcing ring. As a result, a permanent deformation of the contamination-protection device in the mounted state can be avoided.

It is preferred if at least one tab has been attached in the attachment region or on the protective screen. In particular, if the insulator cap has been configured as a clevis cap (cf., for instance, DIN 48 062, Part 2 dated August 1990), the contamination-protection device can be secured with the aid of an appropriate tab against an unintentional lifting of the attachment region away from the insulator cap. For this purpose, the tab can be guided between the forks of the clevis cap below the attachment bolt.

It is particularly preferred if the free end of the tab extends beyond the feed-through aperture at least as far as the outer edge of the protective screen, in which case the tab has preferentially been arranged extending parallel to, and overlapping with, the mounting aperture. As a result, it is ensured that the tab—even if, as described, it has been inserted through the clevis cap—extends across the mounting aperture and in this way serves for covering the mounting aperture. In particular, if the mounting aperture has been realized as a gap, the tab can accordingly cover the gap, in order in this way to ensure a completely closed protective screen. Where required, in this region the tab can be detachably or non-detachably attached to the protective screen, for instance by gluing.

It is furthermore preferred if the width of the tab has been adapted to the width of the mounting aperture, and the free end of the tab has been provided for sealing the radial mounting aperture, in which case the edges of the mounting aperture preferentially each exhibit a guide for the tab. In other words, the tab—for instance, after being guided through a clevis cap—can be guided through into the lateral guides of the mounting aperture, as a result of which, on the one hand, the mounting aperture is closed and, on the other hand, the free end of the tab is secured to the protective screen. In particular in this case a completely tool-free mounting and securing of the contamination-protection device is possible.

Alternatively, it is possible that the at least one tab has been attached in the attachment region or on the protective screen so as to be capable of swiveling, so that in the lowered state it protrudes across the feed-through aperture. In this case the tab may exhibit at its free end a part of a detent closure—a detent element or an engagement aperture. On the opposite side of the feed-through aperture the counterpart to the detent closure then has to be provided, with which the part of the detent closure on the tab can optionally interact. In this case the tab preferentially does not extend parallel to the mounting aperture, in order that the counterpart to the detent closure does not coincide with the mounting aperture. It is also possible to provide several corresponding tabs and, where appropriate, counterparts to the detent closure, which have then preferably been arranged with an angular offset in relation to the feed-through aperture. By virtue of several corresponding tabs, the contamination-protection device can be used for different structural forms of high-voltage insulator or insulator cap, in which case, as a rule, only one of the several tabs is actually used for securing the contamination-protection device. The unused tabs can be separated from the contamination-protection device and removed. If apertures for engagement of detent elements at the free ends of tabs have been provided in the attachment region or on the protective screen, into which no tab engages after mounting, the end regions of unused tabs can be separated and attached in these apertures with their detent elements as closure.

As a further alternative, a separate tab element may have been provided which exhibits at each of its two ends a part of a detent closure—a detent element or an engagement aperture. Counterparts to the detent closures then have to be arranged around the feed-through aperture at suitable positions on the contamination-protection device, for instance on the protective screen, so that the tab element, if it has been attached by its two ends to the contamination-protection device, extends across the feed-through aperture. The tab element may have been connected to the contamination-protection device in captive manner via a material bridge, in which case this material bridge can be bent or destroyed in the course of mounting.

In other versions of the insulator cap—for instance, as a socket cap according to DIN 48 062, Part 1 dated August 1990—it may be advantageous if the tab exhibits at its free end a feed-through aperture for a safety cotter pin or an eyelet element. In this case the tab is, as a rule, not guided through the insulator cap but abuts the latter, in which case the tab can be attached to the insulator cap via a safety cotter pin. In this case the safety cotter pin may have been guided directly through the feed-through aperture. Alternatively, it is possible that the eyelet of an eyelet element has been guided through the feed-through aperture, through which eyelet the safety cotter pin has been guided, in which case the eyelet element engages the feed-through aperture from behind on the side facing away from the eyelet. The safety cotter pin may be, in particular, a safety cotter pin which in principle has already been provided for the attachment of the insulator cap, so that, accordingly, neither an additional safety cotter pin nor a possible structural change to the insulator cap would be required for the purpose of attaching an additional safety cotter pin.

It is preferred if the protective screen has been configured to be substantially circular. If an arcing ring has been provided on the high-voltage insulator, it is further preferred if the radius of the protective screen substantially corresponds to the outer radius of the arcing ring. An arcing ring is a galvanized metal ring mounted at the level of the insulator cap and therefore above the high-voltage insulator, which in the case of an arc parallel to the high-voltage insulator forms an arc base point via which the arc current is conducted away into the ground. The arcing ring serves primarily to keep the arc away from the actual high-voltage insulator, in order to avoid damage thereto.

Since a lot of heat is released when an arc occurs, it is advantageous if the protective screen of the contamination-protection device according to the invention does not extend beyond the arcing ring. The heat arising in the event of an arc can then escape well, without the contamination-protection device being damaged by the evolution of heat.

It is preferred if the protective screen has been inclined toward the outside in such a manner that rainwater flows off outward in the mounted state. By virtue of an appropriate inclination, bird droppings possibly located on the protective screen can be washed off, as a result of which a natural cleaning of the protective screen is obtained. The inclination of the protective screen preferentially amounts to 10° to 30°, more preferably 20°, in relation to the horizontal.

It is further preferred if a drip edge has been provided on the outer edge of the protective screen. As a result, it can be ensured that rainwater flowing off via the protective screen, or bird droppings softened up by rainwater, does/do not get inside on the underside of the protective screen and, in consequence, onto the high-voltage insulator. The drip edge may also take the form of a marginal element that has a sufficient width in order to provide thereon a tab extending across the mounting aperture, which, preferentially in a manner comparable to the other tabs already described above for selective sealing of the mounting aperture, exhibits at its free end a part of a detent closure which can optionally interact with a corresponding counterpart on the other side of the mounting aperture.

As already stated, the protective screen may have been arranged at the end of the attachment region remote from the feed-through aperture. Alternatively, the protective screen has been provided at the level of the feed-through aperture.

In both cases of the hat-shaped configuration of the attachment region the contamination-protection device according to the invention can be produced easily and exhibits good attachment security by reason of the positive closure obtained by the attachment region.

The attachment region, the protective screen and/or the tab may have been realized in one piece. The contamination-protection device is preferentially made, entirely or partially, of synthetic material, preferentially of injection-moldable synthetic material. The synthetic material is preferentially weather-resistant and UV-resistant and exhibits, in addition, good resistance to bird droppings. But it is also possible that the contamination-protection device is made, entirely or partially, of galvanized sheet steel.

For elucidation of the arrangement according to the invention, reference is made to the above statements.

The invention will now be described by way of example on the basis of advantageous embodiments with reference to the appended drawings. Shown are.

Figure 1:
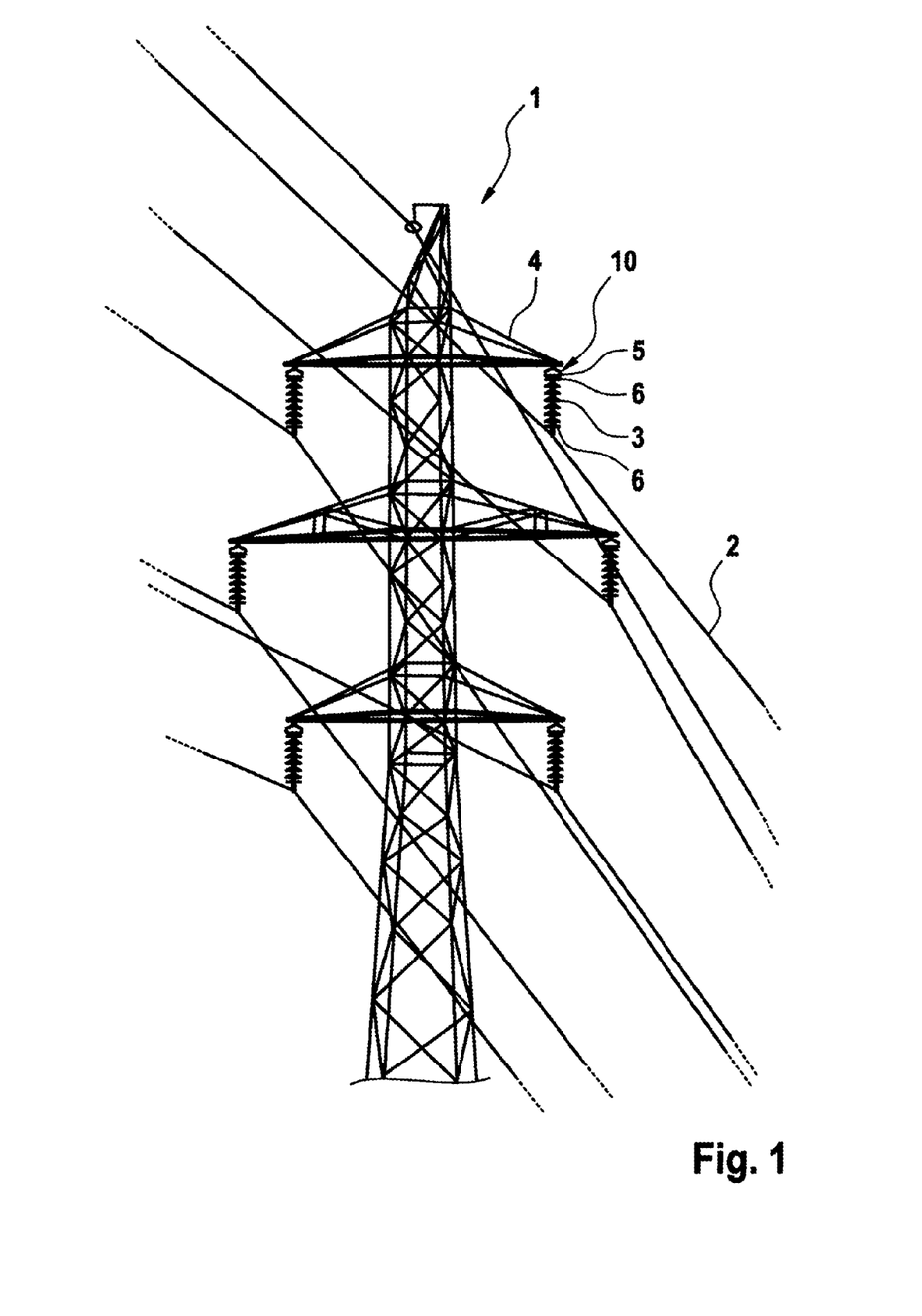
FIG. 1: a schematic representation of a high-voltage tower including arrangements, according to the invention, of high-voltage insulators with contamination-protection devices according to the invention.

In FIG. 1 a high-voltage tower 1 with high-voltage lines 2 suspended therefrom is represented. The high-voltage lines 2 have been attached via high-voltage insulators 3 to the cross-members 4 which electrically isolate the high-voltage lines 2 from the high-voltage tower 1 and hence from the ground potential. For the purpose of attaching the high-voltage insulators 3 to the cross-members 4, the latter exhibit insulator caps 5.

On the high-voltage insulators 3 an arcing ring 6 has been provided in each instance at the upper and lower ends, between which an arc possibly arising is conducted away via the high-voltage insulator 3, in order not to damage the high-voltage insulator 3 itself.

At the upper end of each high-voltage insulator 3 a contamination-protection device 10 according to the invention has furthermore been provided.

Figure 2A:
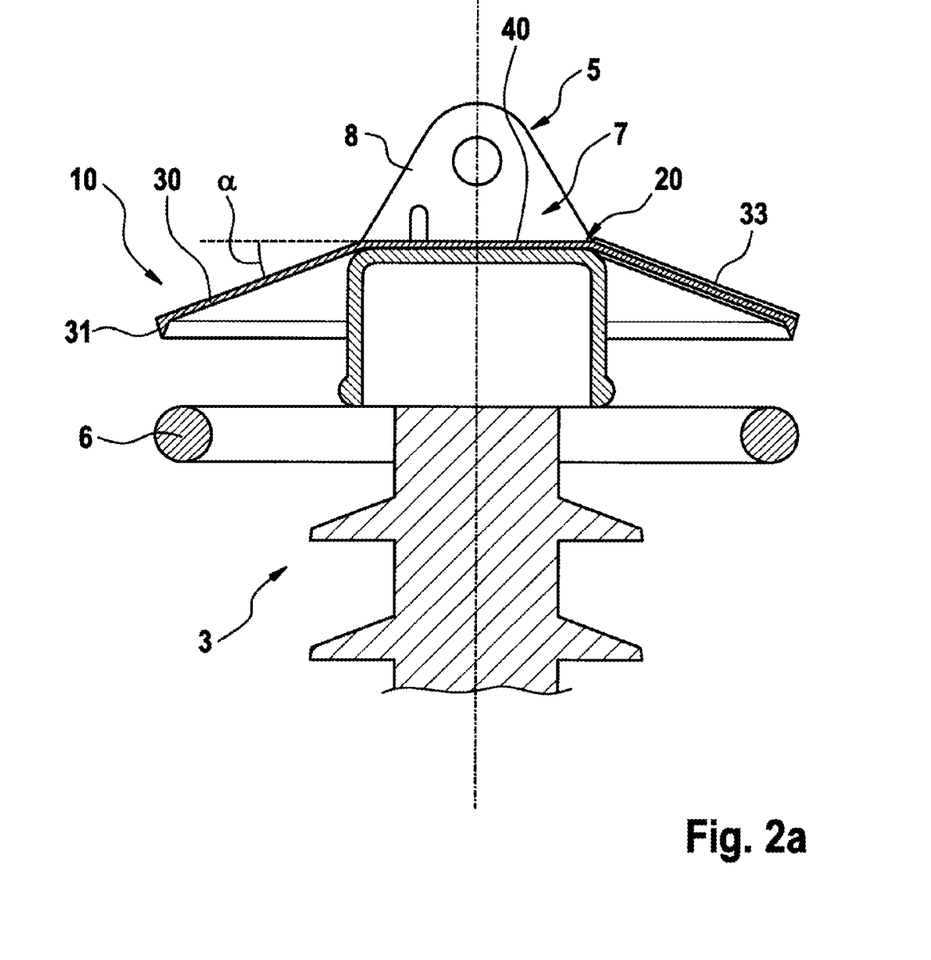
FIGS. 2a-c: schematic representations of a first embodiment of an arrangement, according to the invention, of high-voltage insulator and contamination-protection device according to the invention.

In FIG. 2a the upper end of an arrangement consisting of high-voltage insulator 3 and contamination-protection device 10, as is employed in the high-voltage tower 1 according to FIG. 1, shown in more detail in a sectional representation.

The high-voltage insulator 3, comprising a shaft and arranged insulator screens, has been firmly connected to the insulator cap 5 which in this embodiment has been realized as a clevis cap—that is to say, two forked plates 8 arranged in parallel with mutually aligned bolt feed-through apertures have been provided as connector element 7. The linking to the high-voltage tower 1 is effected via a suitable bolt (not represented).

Figure 2B:
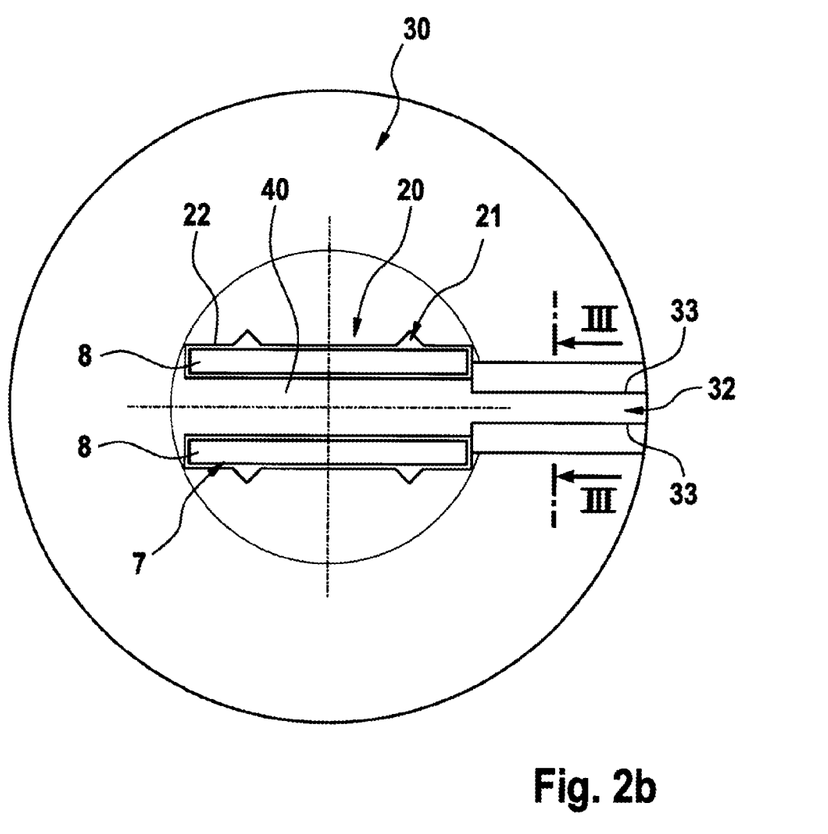

The contamination-protection device 10, which is also represented in a top view in FIG. 2*b*, comprises an attachment region 20 and a protective screen 30.

The attachment region 20 includes a feed-through aperture 21 for the connector element 7, the boundary 22 of which as an envelope positively abuts the two forked plates 8. As a result, a positive connection is created between contamination-protection device 10 and insulator cap 5.

The protective screen 30 has been arranged around the attachment region 20. The protective screen 30 is circular and inclined toward the outside by α=20° in such a manner that rainwater is able to drip off via the protective screen 30 and the peripheral drip edge 31 thereof. The radius of the protective screen 30 substantially corresponds to the outer radius of the arcing ring 6. Hence the protective screen 30 covers the high-voltage insulator 3 and the arcing ring 6 in such a manner that water dripping off from the protective screen 30, which possibly entrains parts of bird droppings collected by the protective screen 30, does not in principle impinge on the high-voltage insulator 3, and also bird droppings deposited directly by a large bird (for example, a stork or a heron), which may suffice in quantity to bridge the air gap between the two arcing rings 6 which are at ground potential or high-voltage potential, cannot cause a short circuit.

In the protective screen 30 and in the attachment region 20 a radially extending mounting aperture 32 has been provided for lateral feed-through of the connector element 7 of the insulator cap 5. This mounting aperture leads from the feed-through aperture 21 in the attachment region 20 as far as the outer edge of the protective screen 30 and has been configured as a gap. The width of the gap is smaller than the dimension of the connector element 7 to be guided through, though the entire contamination-protection device 10 is elastically deformable in such a manner that the mounting aperture 32 can be widened for lateral feed-through of the connector element 7 of the insulator cap 5. The contamination-protection device 10 can in this way also be retrofitted to high-voltage insulators 3 already mounted.

A tab 40 has furthermore been attached to the attachment region 20, the free end of which extends beyond the feed-through aperture 21 as far as the outer edge of the protective screen 30. The tab 40 is guided through between the two forked plates 8 of the insulator cap 5 and may positively abut said forked plates. The tab 40 continues to extend parallel to, and overlapping with, the mounting aperture 32 and consequently closes the gap provided there. As can be seen, in particular, in the partial section according to FIG. 2*c* along line III-III from FIG. 2*b*, the edges 33 of the mounting aperture 32 exhibit guides 34 into which the tab 40 has been inserted. The width of the tab 40 has been adapted to the width of the mounting aperture 32 or the guides 34 thereof. Once the tab 40, as represented, has been inserted into the guides 34, the mounting aperture 32 is sealed in such a manner that liquid bird droppings or bird droppings liquefied by rainwater cannot get through the mounting aperture 32 to the high-voltage insulator 3. But, at the same time, an undesirable lifting of the contamination-protection device 10 away from the insulator cap 5, in interplay with the attachment bolt which has been guided through the connector element 7 and with the tab 40 which has been guided through below the attachment bolt, at least a protection against loss is obtained.

Figure 2C:
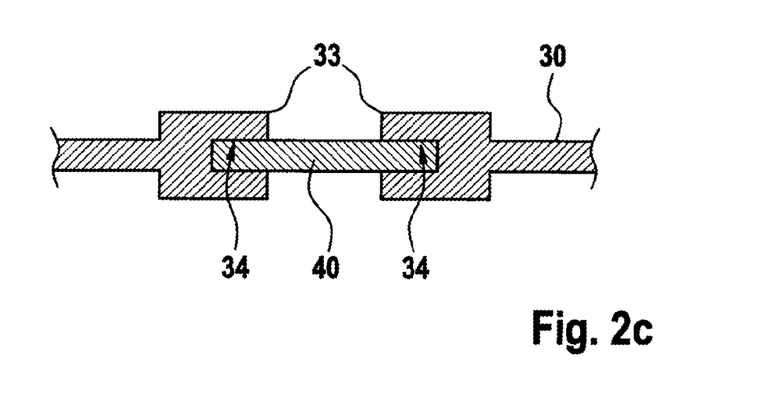

The attachment region 20, the protective screen 30 and the tab 40 have been produced in one piece from synthetic material, for example in an injection-molding process, said synthetic material having been selected to be sufficiently weather-resistant and UV-resistant for the designated operational purpose and, despite basic dimensional stability, sufficiently elastic in order to enable the above-described widening of the mounting aperture 32.

Figure 3:
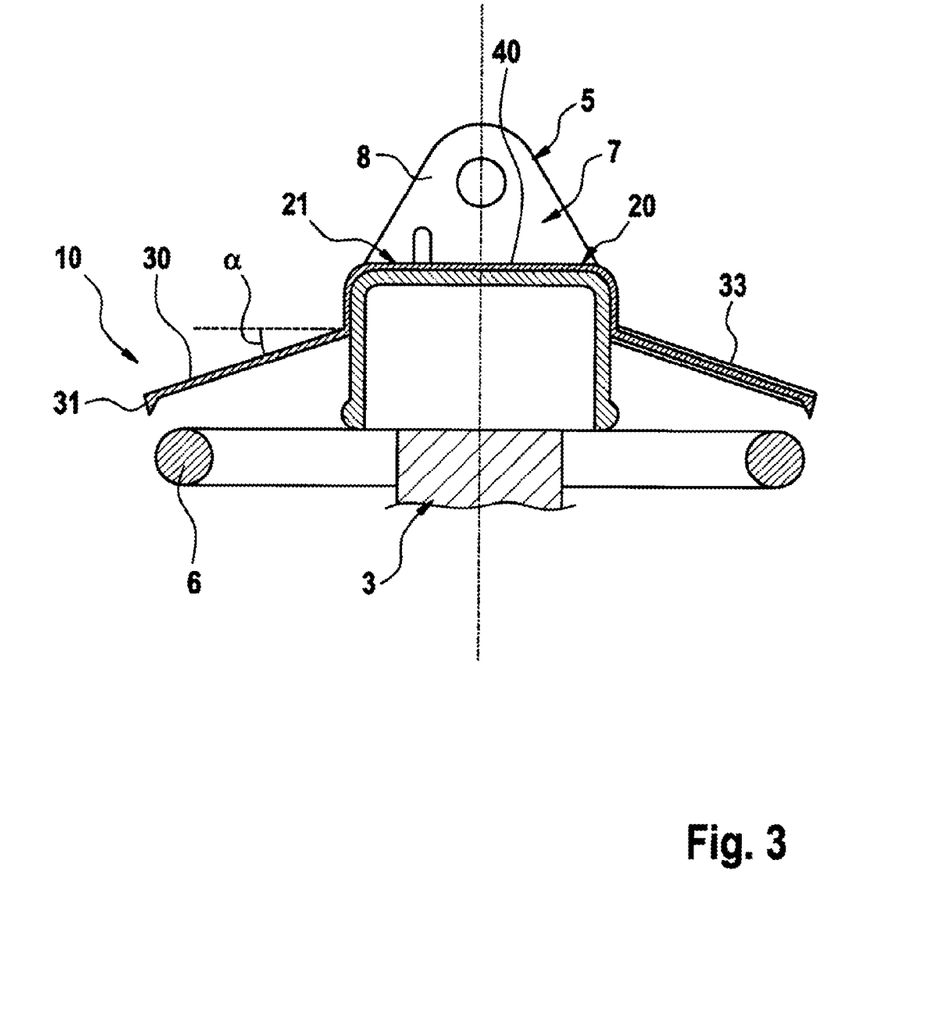
FIG. 3: a schematic representation of a second embodiment of an arrangement, according to the invention, of high-voltage insulator and contamination-protection device according to the invention.

In FIG. 3 an arrangement consisting of high-voltage insulator 3 and contamination-protection device 10 is shown that is comparable to FIGS. 2*a-c*, wherein, however, the contamination-protection device 10 has been realized in slightly differing manner. In the following, therefore, merely the differences displayed by the embodiment shown in FIG. 3 in relation to the embodiment according to FIGS. 2*a-c* will be considered, whereas in other respects reference is made to the above explanatory remarks.

As can be directly discerned in FIG. 3, the attachment region 20 is hat-shaped and designed to be slipped over the insulator cap 5. By virtue of this shaping, the positive closure between the contamination-protection device 10 and the insulator cap 5 is improved further. The protective screen 30 in this case has been arranged at the end of the attachment region 20 remote from the feed-through aperture 21, which is advantageous for manufacture by injection molding. In FIG. 3 it can further be discerned that the tab 40 has been adapted in its shaping to the hat shape of the attachment region 20. This also facilitates manufacture and furthermore avoids unnecessary stresses within the contamination-protection device 10 in the operational state as represented in FIG. 3. In other respects, the contamination-protection device 10 has been realized as described in connection with FIGS. 2*a-c*.

Figure 4A:
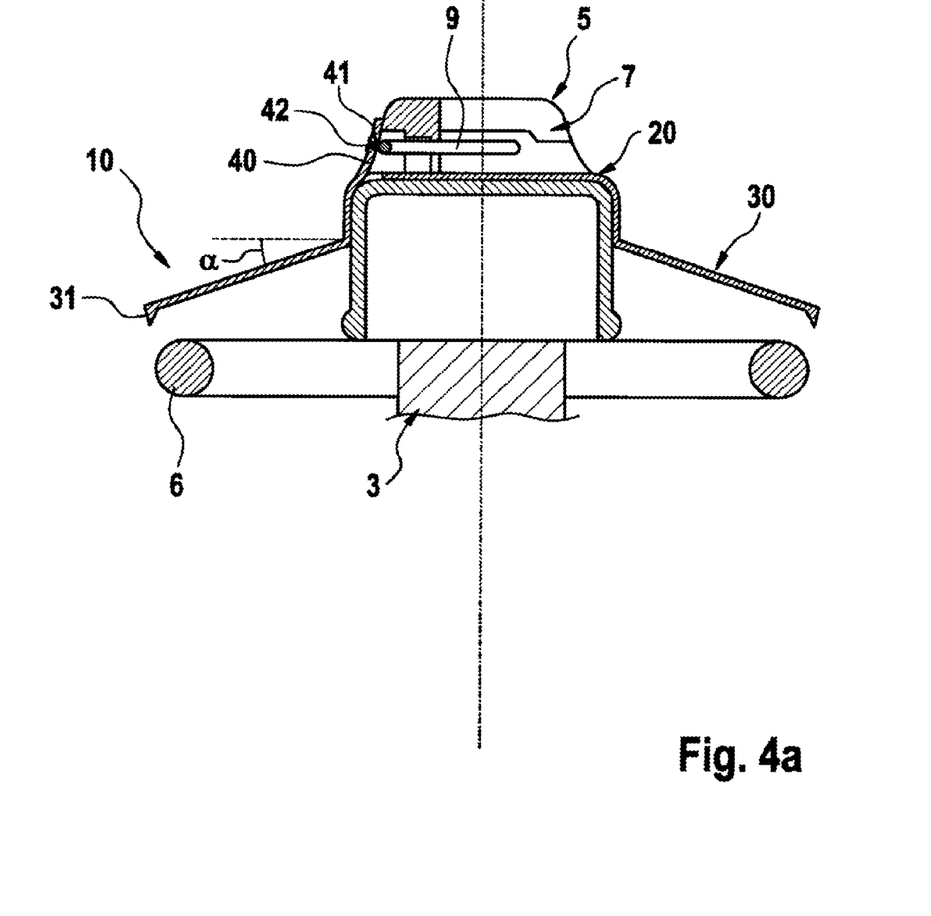
FIGS. 4a-c: schematic representations of a third embodiment of an arrangement, according to the invention, of high-voltage insulator and contamination-protection device according to the invention.
Figure 4B:
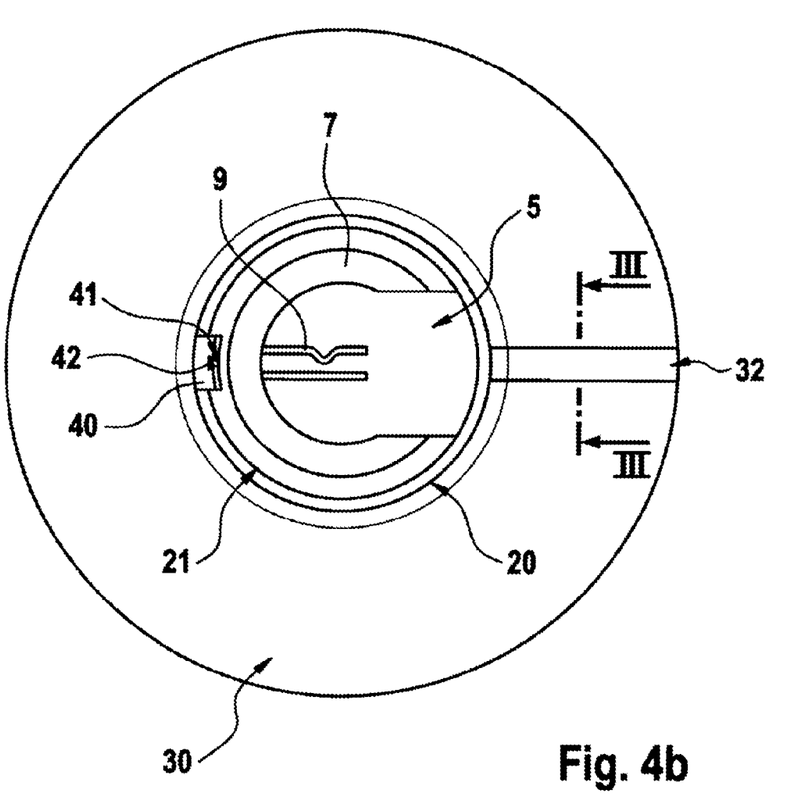
Figure 4C:
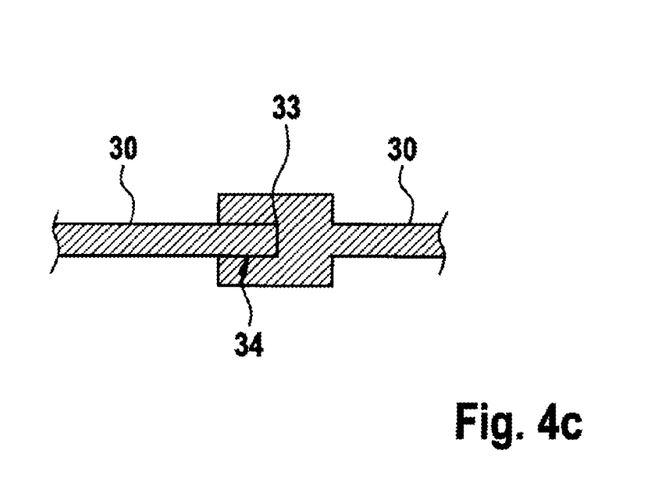

In FIGS. 4*a-c* a further embodiment is represented. In contrast to the embodiments according to FIGS. 2*a-c* and 3, however, the high-voltage insulator 3 does not exhibit a clevis cap but instead exhibits a socket cap as insulator cap 5, resulting in some differences also in the contamination-protection device 10.

Even if the feed-through aperture 21 in the attachment region 20 has been adapted appropriately for the feed-through of the connector element 7 and in principle is able to abut said connector element (not represented), the positive closure between the attachment region 20 and the insulator cap 5 is substantially obtained by virtue of the hat-shaped configuration of the attachment region 20 which is suitable to slipped over the insulator cap 5.

The protective screen 30 has been arranged on the side of the attachment region remote from the feed-through aperture 21. The protective screen 30 has been dimensioned, inclined and provided with a drip edge 31 so as to be comparable to the protective screen from FIGS. 2*a-c* and 3. In this regard, reference is therefore made to the above statements. The mounting aperture 32, on the other hand, has been realized not as a wide gap but merely as a slit (that is to say, as a gap with zero width). Since the contamination-protection device 10, like the previous devices, has been produced in one piece in an injection-molding process from, in principle, dimensionally stable, albeit sufficiently elastic, synthetic material, the mounting aperture 32 can be sufficiently widened in order to be able to push the contamination-protection device 10 in the mounted state of the high-voltage insulator 3 laterally onto the insulator cap 5. As can be seen in the partial section according to FIG. 4*c* along line III-III from FIG. 4*b*, one edge 33 of the mounting aperture 32 exhibits a guide 34 into which the other edge 33 has been inserted. As a result, a detachable closure of the mounting aperture 32 configured as a slit is obtained, with which the stability of the contamination-protection device 10 can be increased. In addition, the mounting aperture 32 is sealed off, so that, for instance, liquid bird droppings or bird droppings liquefied by rainwater cannot get to the high-voltage insulator 3 through the mounting aperture 32.

The tab 40 attached to the attachment region 20 has been guided upward on the connector element 7 in the installed state and exhibits a feed-through aperture 41 through which an eyelet element 42 has been guided. Through the eyelet of the eyelet element 42 the safety cotter pin 9 has been guided which is customary in socket caps for securing the pin (not represented) in the connector element 7, said eyelet element 42 engaging the feed-through aperture 41 from behind with its other end, so that the tab 40 has been attached to the safety cotter pin 9. As a result, the contamination-protection device 10 has been secured to the high-voltage insulator 3 or to the insulator cap 5 thereof.

Figure 5A:
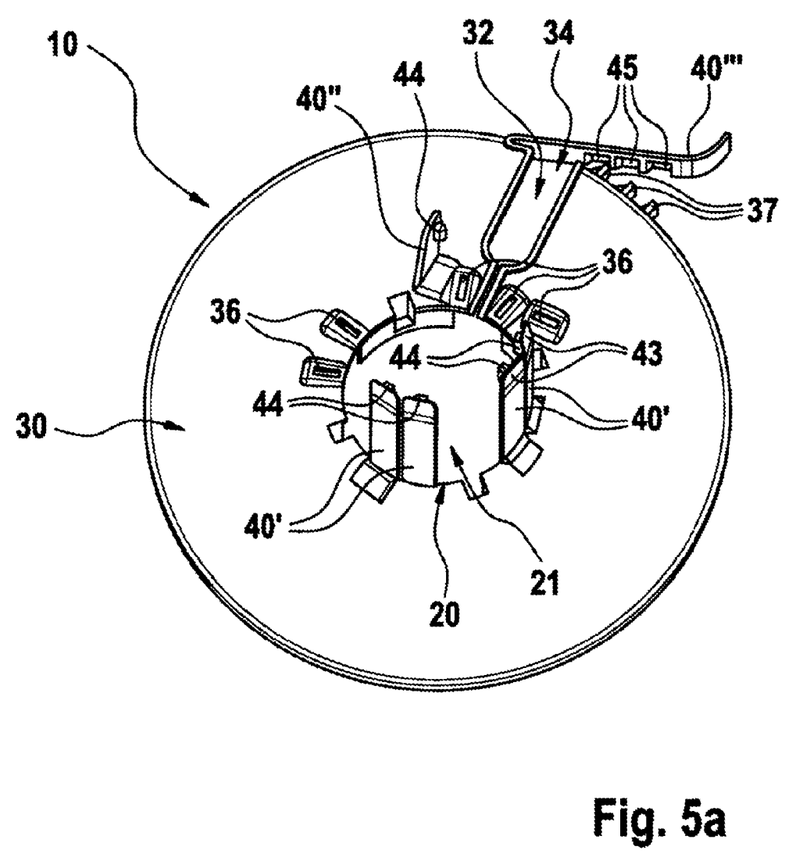
FIG. 5a,b: schematic representations of a further embodiment of a contamination-protection devices according to the invention.

In FIGS. 5*a*,*b* a further embodiment of a contamination-protection device 10 according to the invention is represented, the use of which on a high-voltage insulator 3 is represented in FIGS. 6*a*-*d*.

Figure 5B:
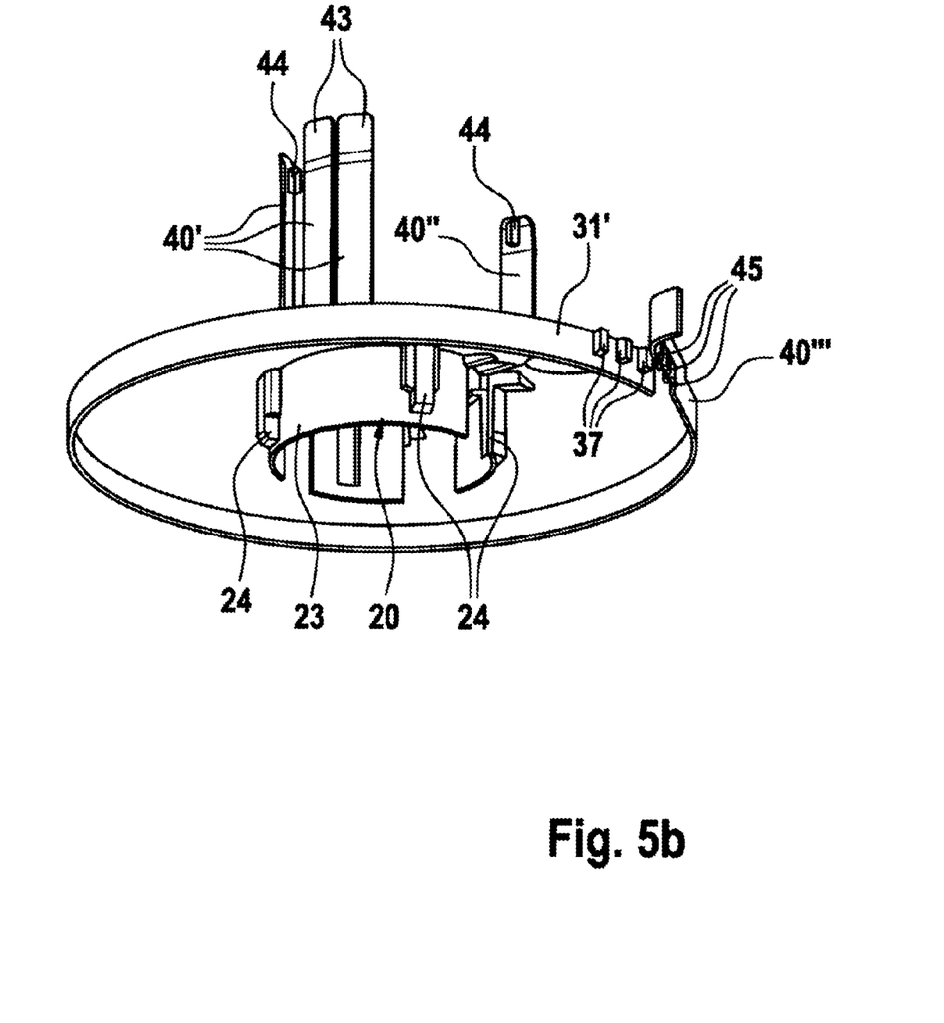

The contamination-protection device 10 includes an attachment region 20 with a feed-through aperture 21 for the connector element 7 of a high-voltage insulator 3, said feed-through aperture taking up the entire roof of the hat-shaped attachment region 20. The side walls 23 of the attachment region 20 are slotted and on their outside exhibit feed-throughs 24 through which, when required, a UV-resistant cable tie can be pulled, in order additionally to secure the intrinsically positive connection between the attachment region 20 and an insulator cap 5 guided through it.

The protective screen 30 extends from the roof of the attachment region 20 and is inclined toward the outside, so that, when it is used properly, rainwater is able to flow off outward and across the drip edge 31 formed at the outer rim of the protective screen 30 as marginal element 31'. The protective screen 30 exhibits a radially extending mounting aperture 32, through which the connector element 7 of an insulator cap 5 can be guided for mounting purposes. The contamination-protection device 10 which has been realized in one piece has been produced from such elastic material that the mounting aperture 32 can be widened sufficiently for this purpose. In addition, the mounting aperture 32 also exhibits a widened portion 34, through which the holder 6' of an arcing ring 6 of the high-voltage insulator 3 can be guided, without the contamination-protection device 10 having to be deformed for this purpose (cf. FIGS. 6*a*-*d*).

Various tabs 40 have been provided on the contamination-protection device 10.

Some of the tabs 40—denoted below and in the figures by 40' for better distinguishability—have been attached to the protective screen 30 so as to be capable of swiveling in such a manner that in the lowered state they protrude across the feed-through aperture 21. At their free ends 43 the tabs 40' exhibit detent elements 44 with which they can optionally engage in corresponding apertures 36 on the protective screen 30, in accordance with the principle of a detent closure. The tabs 40' in question have been arranged with an angular offset in relation to the feed-through aperture 21, so that the contamination-protection device 10 can be used with various high-voltage insulators 3 or configurations. The tabs 40' can—to the extent that they are not needed—easily be separated, for instance with the aid of side-cutting pliers. From separated tabs 40', in turn, the ends 43 with the detent elements 44 can be separated and subsequently used as closure of the apertures 36 that are not needed for forming a detent closure (cf. FIG. 6*d*).

A further tab 40 or 40", which has been realized so as to be analogous to the tabs 40', extends in the lowered state across the mounting aperture 32 and can with its detent element 44 engage the aperture 36 provided for it on the protective screen 30 for the purpose of forming a detent closure. Tab 40" has been arranged in such a way that in the lowered state it is additionally able to secure at least individual previously lowered tabs 40' by placing itself across the tab 40' in question.

The tab 40 or 40''' arranged on the marginal element 31' so as to be capable of swiveling also extends across the mounting aperture 32. However, this tab 40''' exhibits no detent element at its free end 43, but rather engagement apertures 45 in which detent elements 37 provided on the marginal element 32 are able to engage for the purpose of forming a detent closure. For the purpose of enhancing the security of the closure, tab 40''' comprises several engagement apertures 45 which interact with several corresponding detent elements 37.

The mounting of the contamination-protection device 10 shown in FIGS. 5*a*,*b* onto a high-voltage insulator 3 will now be elucidated on the basis of FIGS. 6*a*-*d*. Of the high-voltage insulator 3, merely the upper part is represented in FIGS. 6*a*-*d*.

The contamination-protection device 10 with its hat-shaped attachment region is firstly placed onto the insulator cap 5 of the high-voltage insulator 3. With a fully mounted high-voltage insulator 3, for this purpose the mounting aperture 32 of the protective screen 30 is stretched in such a manner that the connector element 7 can be guided through, so that the contamination-protection device 10 can firstly be placed laterally onto the high-voltage insulator 3, before subsequently a positive closure between the attachment region 21 and the insulator cap 5 is obtained by displacing the contamination-protection device 10 in the axial direction of the high-voltage insulator 3. In this case, the holder 6' of the arcing ring 6 has been guided through the widened portion 34 of the mounting aperture.

Figure 6A:
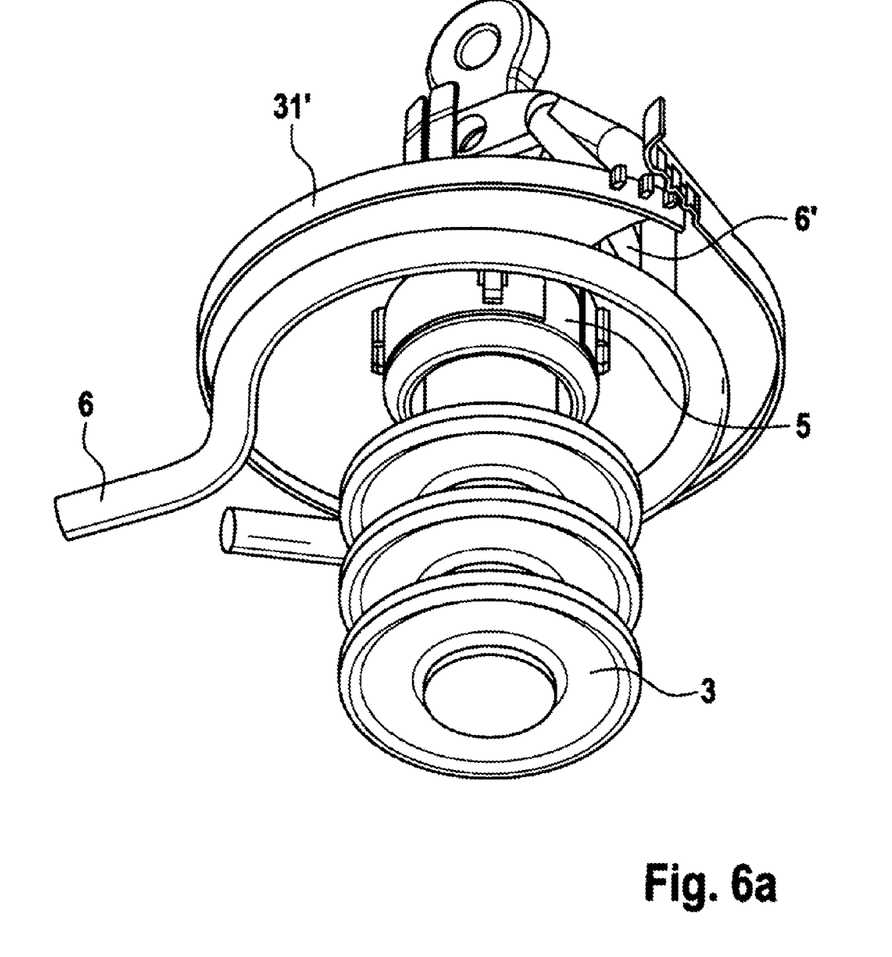
FIGS. 6a-d: schematic representation of the mounting of a contamination-protection device according to FIGS. 5a,b on a high-voltage insulator.
Figure 6B:
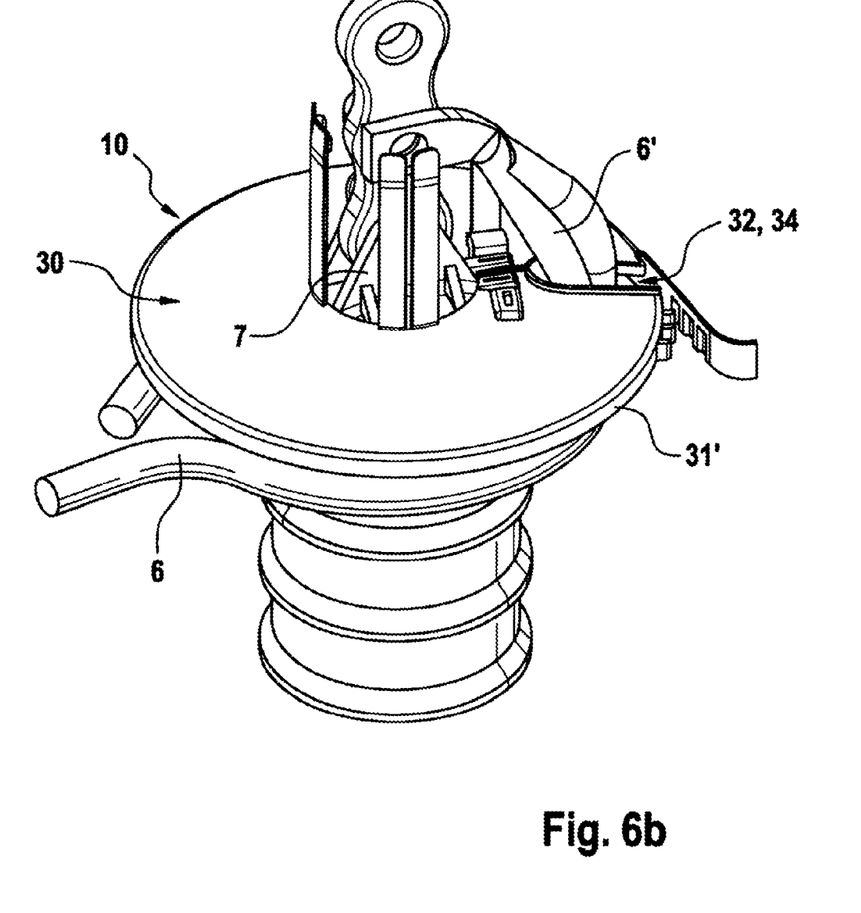

The state of the contamination-protection device 10 after the initial placement onto the high-voltage insulator 3 is shown in FIGS. 6*a*,*b*.

As is immediately evident, in particular, from FIG. 6*b*, merely one of the tabs 40' has been suitably arranged in order to be guided through the connector element 7 of the insulator cap 5. This tab 40' is guided through the connector element 7 and, with its detent element 44, into the corresponding aperture 36 in the protective screen 30. Subsequently tab 40" is lowered, and the corresponding detent closure is likewise closed. The remaining tabs 40' are separated with side-cutting pliers, whereby the ends 43 of the tabs 40', which include the detent element 44, are separated once again in order to be inserted onto the free apertures 36 in the protective screen 36 as closure.

Figure 6C:
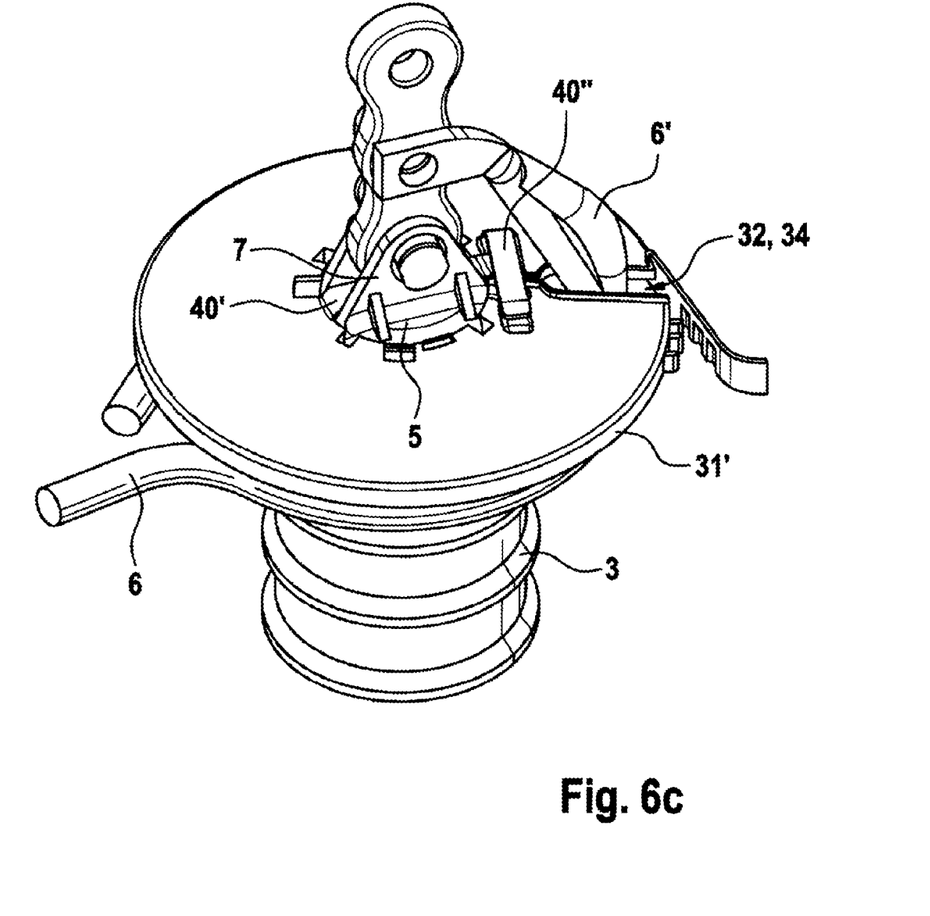
Figure 6D:
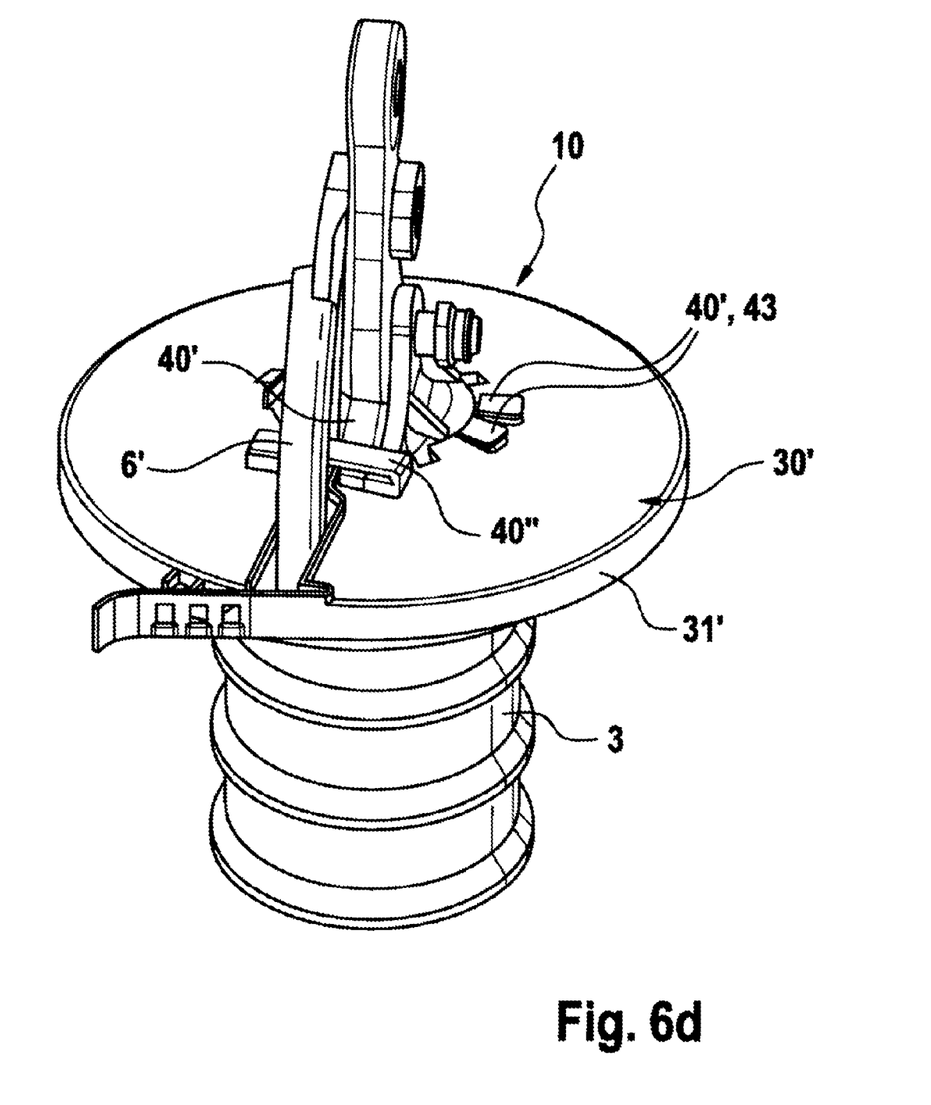

The state of the contamination-protection device 10 after these mounting steps is shown in FIGS. 6*c*,*d*.

Lastly, only tab 40''' is closed (not represented). In particular, the tabs 40" and 40''' increase, when closed, the dimensional stability of the contamination-protection device 10 which has been produced in one piece from elastic material.

The invention claimed is:

1. A contamination-protection device (10) for high-voltage insulators (3) for attachment to an insulator cap (5) of the high-voltage insulator (3), the device comprising an attachment region (20), which is designed for a positive connection to the insulator cap (5) and exhibits a feed-through aperture (21) for connector element (7) of the insulator cap (5), and a protective screen (30) which extends radially around the attachment region (20) in order to cover the high-voltage insulator (3); wherein at least one tab (40) is attached in the attachment region (20) or on the protective screen (30); and wherein said tab (40') exhibits at free end (43) a part of a detent closure (44) for interacting with a corresponding counterpart element on the opposite side of the feed-through aperture (21).

2. The device as claimed in claim 1, characterized in that the attachment region (20) is hat-shaped and designed to be slipped over the insulator cap (5).

3. The device as claimed in claim 1, characterized in that the contamination-protection device (10) exhibits a radial mounting aperture (32), extending from the feed-through aperture (21) as far as the outer edge of the protective screen (30), for lateral feed-through of the connector element (7) of the insulator cap (5).

4. The device as claimed in claim 3, characterized in that the insulator cap (5) comprises widened sections.

5. The device as claimed in claim 1, characterized in that a free end of the tab (40) extends beyond the feed-through aperture (21) at least as far as the outer edge of the protective screen (30).

6. The device as claimed in claim 5, characterized in that the width of the tab (40) is adapted to the width of the mounting aperture (32), and the free end of the tab (40) is provided for sealing the radial mounting aperture (32), the edges (33) of the mounting aperture (32) preferentially each exhibiting a guide (34) for the tab (40).

7. The device as claimed in claim 5, wherein said tab (40) is arranged extending parallel to, and overlapping with, the mounting aperture (32).

8. The device as claimed in claim 1, characterized in that at least one tab (40') is attached in the attachment region (20) or on the protective screen (30) so as to be capable of swiveling in such a manner that in the lowered state it protrudes across the feed-through aperture (21).

9. The device as claimed in claim 1, characterized in that the tab (40) exhibits at its free end a feed-through aperture (41) for a safety cotter pin (9) or an eyelet element (42).

10. The device as claimed in claim 1, characterized in that the device comprises at least one tab (40", 40'") extending across the mounting aperture (32), wherein:
 i) the at least one tab (40", 40'") is attached on one side of the mounting aperture (32) so as to be capable of swiveling and at the other end exhibits a part of a detent closure for interacting with a counterpart element provided on the other side of the mounting aperture (32), or
 ii) the at least one tab (40", 40'") is a separate tab element which at each of two ends exhibits a part of a detent closure, wherein counterpart elements suitable for detent closure are provided on both sides of the mounting aperture (32).

11. The device as claimed in claim 1, characterized in that the protective screen (30) is configured to be substantially circular.

12. The device as claimed in claim 11, wherein the radius of the protective screen (30) corresponds substantially to the outer radius of an arcing ring (6) of the high-voltage insulator (3).

13. The device as claimed in claim 1, characterized in that the protective screen (30) is inclined at an inclination angle (a) toward the outside in such a manner that in the mounted state rainwater flows off outward.

14. The device as claimed in claim 13, wherein the inclination angle (a) is from 10° to 30°.

15. The device as claimed in claim 1, characterized in that a drip edge (31) is provided on the outer edge of the protective screen (30), and said drip edge (31) may take the form of a marginal element (31') including a tab (40'") extending across the mounting aperture (32).

16. The device as claimed in claim 1, characterized in that the attachment region (20), the protective screen (30) and/or the tab (40) are in one piece and/or made of synthetic material.

17. An arrangement comprising a high-voltage insulator (3) with insulator cap (5) and a contamination-protection device (10) arranged on the insulator cap (5), wherein the contamination-protection device (10) is designed as claimed in claim 1, and is connected to the insulator cap (5) by positive closure.

18. The arrangement of claim 17, wherein the insulator cap (5) is a clevis cap or a socket cap, and/or wherein the high-voltage insulator (3) exhibits an arcing ring (6) in the region of the insulator cap (5).

19. A contamination-protection device (10) for high-voltage insulators (3) for attachment to an insulator cap (5) of the high-voltage insulator (3), the device comprising an attachment region (20), which is designed for a positive connection to the insulator cap (5) and exhibits a feed-through aperture (21) for connector element (7) of the insulator cap (5), and a protective screen (30) which extends radially around the attachment region (20) in order to cover the high-voltage insulator (3); wherein a separate tab element is provided which exhibits at each of its two ends a part of a detent closure for interacting with corresponding counterparts on the contamination-protection device (10), said counterparts having been arranged in such a manner that the tab element in the state attached thereto extends across the feed-through aperture (21).

20. The device as claimed in claim 19, characterized in that the protective screen (30) is configured to be substantially circular.

21. The device as claimed in claim 19, characterized in that the protective screen (30) is inclined at an inclination angle (a) toward the outside in such a manner that in the mounted state rainwater flows off outward.

22. The device as claimed in claim 19, characterized in that a drip edge (31) is provided on the outer edge of the protective screen (30), and said drip edge (31) may take the form of a marginal element (31') including a tab (40'") extending across the mounting aperture (32).

23. The device as claimed in claim 19, characterized in that the attachment region (20), the protective screen (30) and/or the tab (40) are in one piece and/or made of synthetic material.

* * * * *